P. ECKENROTH.
VALVE.
APPLICATION FILED NOV. 17, 1920.

1,404,103.

Patented Jan. 17, 1922.
2 SHEETS—SHEET 1.

Inventor-
Philip Eckenroth.
by his Attorneys-
Howson & Howson

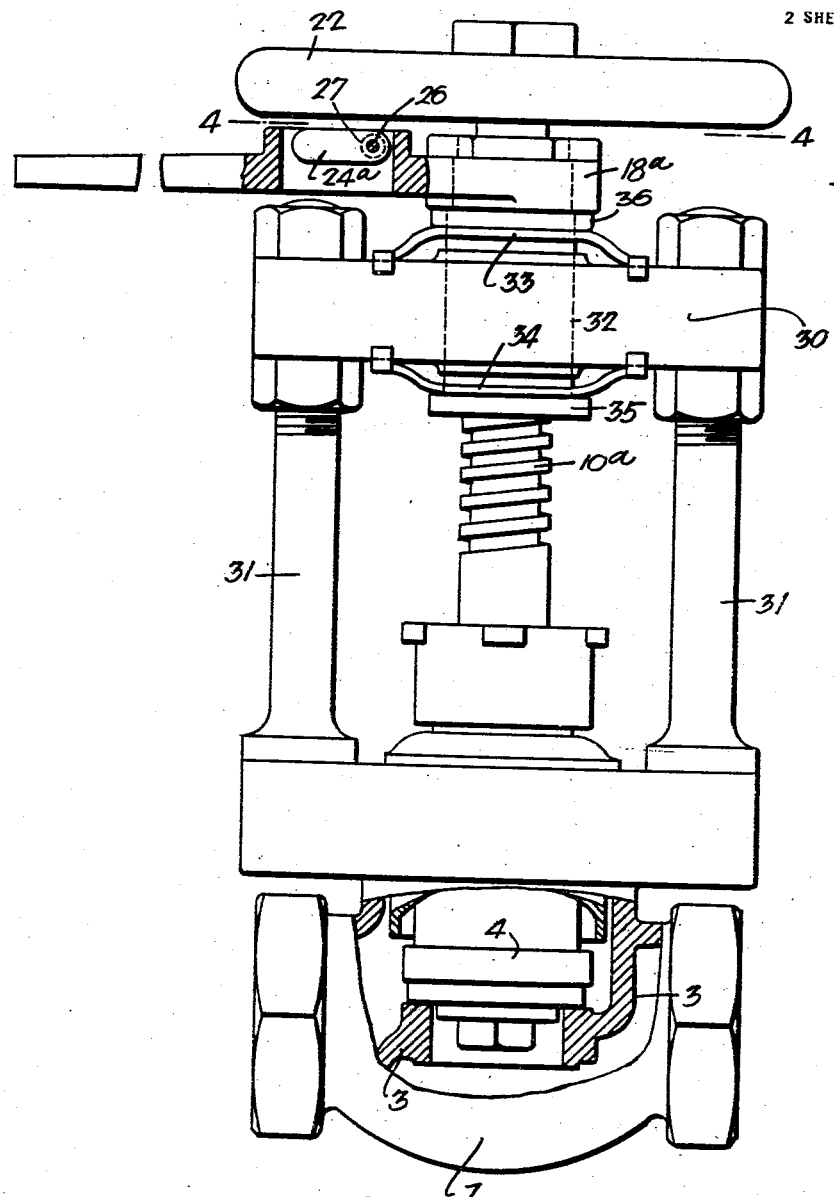
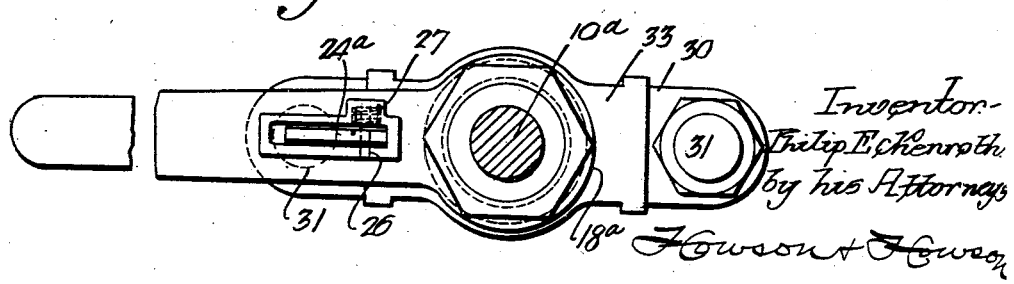

UNITED STATES PATENT OFFICE.

PHILIP ECKENROTH, OF PHILADELPHIA, PENNSYLVANIA, ASSIGNOR TO ECKENROTH VALVE AND MANUFACTURING COMPANY, OF PHILADELPHIA, PENNSYLVANIA, A CORPORATION OF PENNSYLVANIA.

VALVE.

1,404,103.     Specification of Letters Patent.     Patented Jan. 17, 1922.

Application filed November 17, 1920. Serial No. 424,653.

*To all whom it may concern:*

Be it known that I, PHILIP ECKENROTH, a citizen of the United States, residing in Philadelphia, Pennsylvania, have invented Valves, of which the following is a specification.

This invention has to do with a novel device whereby the coacting faces of a movable valve member and its seat may be maintained clean and free from deposits of solid material; one object of the invention being to provide a relatively simple, inexpensive and substantial combination of parts whereby, after being seated, the movable valve element may be turned on its seat without being bodily moved toward the same.

Another object of the invention is to provide novel means for supporting a valve spindle in a yoke or bonnet in such manner as to permit it to yield longitudinally to a limited extent and at the same time allow it to be given a longitudinal thrust without being rotated, or if desired, rotated without being moved longitudinally, so as to cause the valve disc or other movable valve member to be pressed toward its seat with any desired force and then turned relatively thereto.

I also desire to provide a valve with a novel structure for supporting its spindle, together with means for moving such structure relatively to a yoke or bonnet in order to turn said spindle without moving it longitudinally or vice versa; the invention contemplating novel means whereby said structure may be operatively connected to the spindle so as to be moved therewith or on the other hand held from movement.

I further desire to provide a form of valve including a stuffing box for its spindle and an auxiliary valve seat for coaction with the movable valve member to cut off the interior of the valve from said stuffing box, together with novel means whereby it shall be possible to rotate the movable valve member relatively to both the auxiliary and the main valve seats for the purpose of cleaning them and insuring its fluid tight engagement therewith.

These objects and other advantageous ends I attain as hereinafter set forth, reference being had to the accompanying drawings, in which, Fig. 1 is a longitudinal vertical section of a stop valve constructed in accordance with my invention;

Fig. 3 is a side elevation partly in vertical section, illustrating a modified form of the invention; and Fig. 4 is a plan on the line 4—4, Fig. 3.

Figure 1:
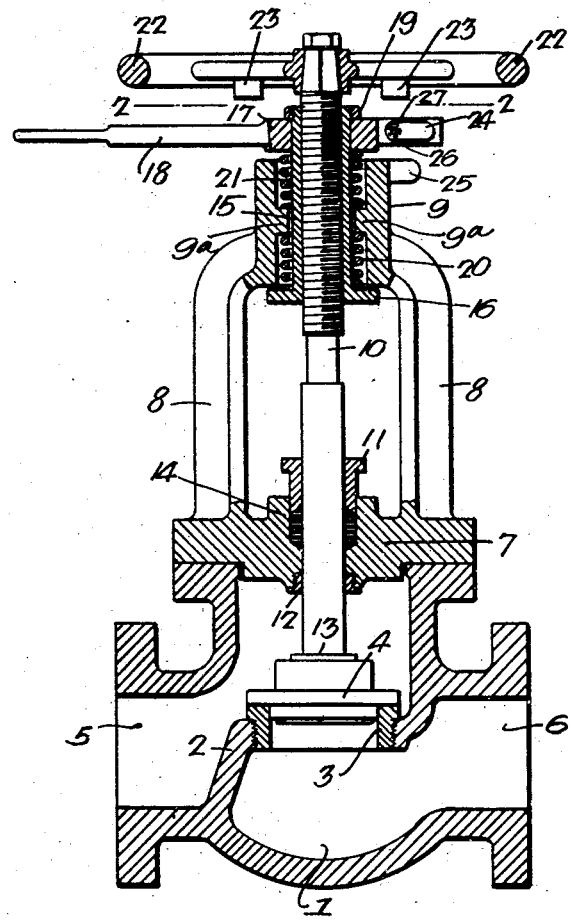
Figure 2:
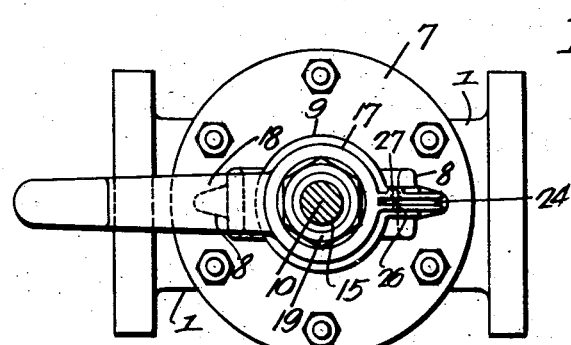
Fig. 2 is a horizontal section on the line 2—2, Fig. 1.

In Figs. 1 and 2 of the above drawings, 1 represents a casing constituting the hollow body, in the present instance, of a globe valve having within it a partition 2 provided with an opening in which is mounted an annular valve seat 3 designed to cooperate with a disc shaped valve member 4, to cut off or allow of communication between the inlet 5 and the outlet 6 of said casing.

In a plane at right angles to the planes of the inlet and outlet, the casing 1 is provided with a second opening closed by a bonnet or cover 7 having formed integral with it a yoke 8 which supports a tubular guide structure 9 for a spindle 10 whose lower end is detachably connected to the movable valve member 4 in such manner that this latter is necessarily turned or rotated with it. A stuffing box 14 having a gland 11 is provided to prevent escape of fluid from the interior of the casing 1 through the cover 7 whose inner face has mounted in it a seat 12 designed to cooperate with the flat upper face 13 of the valve member 4 to prevent escape of fluid from the casing 1 when it is necessary to remove said gland.

Within the tubular guideway 9 is an inwardly projecting annular rib 9ª more or less closely fitting a sleeve 15 whose lower end has a flange 16 and which is threaded on the valve spindle 10. A flanged collar 17 is threaded on the upper end of this sleeve and is fixed to or formed integral with a projecting arm or handle 18, being retained in place by a removable nut 19. A coil spring 20 is mounted on the sleeve 15 between the rib 9ª and the flange 16; and a second spring 21 is similarly confined between said rib and the collar 17;— the whole being so arranged that said flange and collar are normally maintained a short distance away from the adjacent ends of the guide structure 9 so that the sleeve 15 is resiliently supported and free to move longitudinally to a limited extent.

The upper end of the valve spindle 10 has fixed to it a hand wheel or operating member 22 and this has projecting downwardly from its spokes one or more lugs 23 designed to cooperate with a swinging latch 24 on the arm 18 to operatively connect the arm 18 and said hand wheel. One or more lugs 25 may also be provided on the upper part of the guide member 9 in position to serve as a stop means for the latch 24 to prevent the relative movement of the operating member 18, the latch being pivotally mounted on a pin 26 and frictionally engaged by a spring 27 so that it tends to remain in any given position.

With the above described arrangement of parts and assuming that the latch 24 is in its lower position in engagement with the lug 25, and the sleeve nut 15 with the handle 18 is held for movement, rotation of the spindle 10 by the hand wheel 22 will raise or lower the movable valve member 4 so as to cause its lower face to engage the seat 3 or to bring its upper face 13 into engagement with the upper seat 12.

Obviously the valve member 4 is forced toward its seat 3 with a yielding pressure, since after being brought into engagement therewith, further rotation of the hand wheel 22 will cause compression of the spring 20 by reason of the upward thrust exerted on the nut 15. If now the latch 24 be moved up so as to be engaged by one of the lugs 23 of the operating handle, the subsequent turning of said wheel 22 will rotate the spindle 10 and with it the nut 15, without causing longitudinal movement of said spindle, so that the contacting faces of the seat 3 and valve member 4 are ground together under the yielding pressure exerted by the spring 20, thereby wearing away any encrustation or other foreign matter which may be lodged between said faces and ultimately insuring their fluid tight engagement.

Similarly, when the valve member 4 has been disengaged from its seat 3, the spindle 10 may be rotated by the hand wheel 22 so as to bring the face 13 of said member into engagement with the upper valve seat 12 with any desired degree of force, depending upon the strength of the spring 21. Thereafter the rotation of the nut 15 by the handle 18 will grind or wear the contacting faces of said seat and valve member so as to insure that there shall be no escape of fluid under pressure through the stuffing box 14, thereby permitting the gland 11 to be safely removed and the packing in said stuffing box renewed or inspected. With the valve member 4 in a position intermediate the seats 3 and 12 it is supported wholly by the springs 20 and 21.

In that form of my invention shown in Figs. 3 and 4, I have employed a pair of stud bolts 31, carried by the casing 1 and supporting a cross bar 30, having a central opening for the reception of a nut 32 threaded to receive the threaded portion of the valve stem 10ª. Above and below said nut I mount spring plates 33 and 34 each formed with a central opening to permit of its passage. The lower end of the nut has a flange or shoulder 35 engaging the spring plate 34, while the upper plate 33 is confined to the cross bar 30 by a collar 36 threaded on said nut. Above this collar I fix to the nut a handle 18ª whereby the latter may be turned, and said handle, as in the other form of my invention, carries a movable latch 24ª which may be raised to engage the spokes of the hand wheel when it is desired to turn the movable valve member on its seat 3 without causing it to move toward or from the same. This handle may also be employed, as in the other form of my invention, to give an endwise thrust to the valve member by turning the nut 32 without imparting turning movement to said member. If it be desired to limit such movement, the latch 24ª may be lowered so as to engage one of the nuts of the stud bolts.

I claim:—

1. The combination in a valve of a casing structure having a seat; a movable valve member for the seat; a threaded stem fixed to said valve member to turn the same; means for turning the stem; a nut threaded on the stem and rotatably supported by the casing; a handle for turning the nut; and a spring between the nut and the casing structure.

2. The combination in a valve of a casing structure having a seat; a valve member for said seat; a threaded stem fixed to said member to turn the same; a nut rotatably mounted on the casing structure and threaded on the stem; a handle for turning the nut; and two springs supporting the nut from the casing structure.

3. The combination in a valve of a casing having a seat; a valve member cooperating with said seat; a threaded stem connected to said valve member; a yoke mounted on the casing; a nut rotatably mounted on the yoke and threaded on the valve stem; a handle connected to the nut; and at least one spring for resiliently supporting the nut from the yoke.

4. The combination in a valve of a casing having a seat; a valve member cooperating with said seat; a threaded stem connected to said valve member; a yoke mounted on the casing; a nut rotatably mounted on the yoke and threaded on the valve stem; a handle connected to the nut; with a latch for connecting the nut and yoke at will to prevent rotation of said nut.

5. The combination in a valve of a casing having a seat; a valve member cooperating with said seat; a threaded stem connected to said valve member; a yoke mounted on the casing; a nut rotatably mounted on the yoke and threaded on the valve stem; a handle connected to the nut; with a latch for connecting the nut to the stem or to the yoke at will.

6. The combination in a valve of a casing having a stuffing box and two valve seats; a valve member in the casing; a stem extending through the stuffing box and connected to the valve member for moving the same into engagement with either seat at will; a nut threaded on said stem and rotatably carried by the casing structure; means for turning the stem; other means for independently turning the nut; with springs resiliently supporting the nut and permitting limited movement thereof in either direction longitudinally of the stem.

7. The combination in a valve of a casing structure; a seat therein; a valve member for said seat; a stem connected to said valve member; a nut threaded on the stem and rotatably supported by a portion of the casing structure; two abutments on the nut respectively on opposite sides of the portion of the casing structure on which it is supported; springs mounted respectively between said portion and said abutments; with means for turning the stem; and other means for turning the nut.

8. The combination in a valve of a seat; a valve member for said seat; a stem connected to the valve member; a yoke on the casing having a tubular guideway provided with an internal annular rib; a nut rotatably mounted in said guideway and having abutments; springs mounted between the rib and said abutments respectively; with means for turning the nut; and other means for turning the stem.

9. The combination in a valve of a seat; a valve member for said seat; a stem connected to the valve member; a yoke on the casing having a tubular guideway provided with an internal annular rib; a nut rotatably mounted in said guideway and having abutments; springs mounted between the rib and the abutments respectively; means for turning the nut; other means for turning the stem; with means for connecting said nut and stem at will to cause them to rotate together.

PHILIP ECKENROTH.